Aug. 16, 1960 N. E. ANDERSON 2,949,391
METHOD AND APPARATUS FOR AUTOMATIC TORCH POSITIONING
Filed April 30, 1958
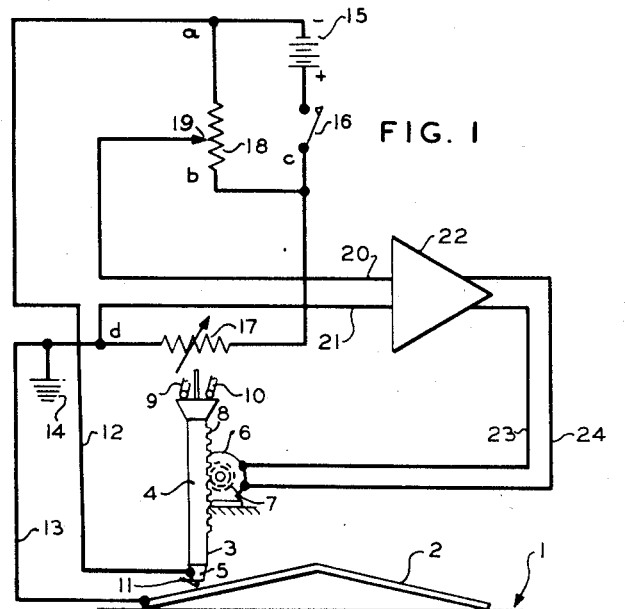
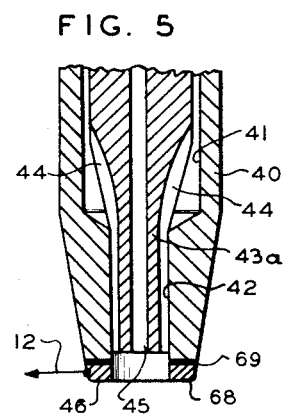
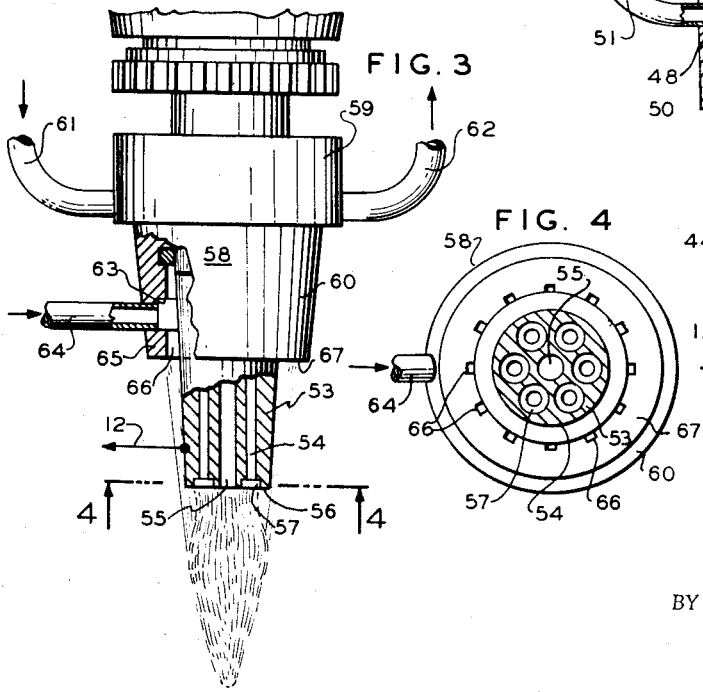
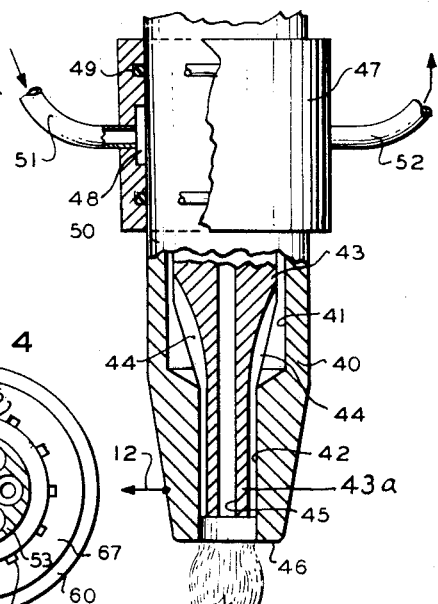
INVENTOR.
NELSON E. ANDERSON
BY H. Hume Mathews
Leslie B. Byer
ATTORNEYS

United States Patent Office 2,949,391
Patented Aug. 16, 1960

2,949,391
METHOD AND APPARATUS FOR AUTOMATIC TORCH POSITIONING

Nelson E. Anderson, Berkeley Heights, N.J., assignor to Air Reduction Company, Incorporated, New York, N.Y., a corporation of New York Filed Apr. 30, 1958, Ser. No. 731,959

6 Claims. (Cl. 148—9)

This invention relates to improvements in means for automatically maintaining a predetermined separation between the tip of a gas fueled heating torch and a workpiece to be heated while the torch is moving relative to the workpiece across the surface thereof.

Fully automatic guidance of one or more cutting torches to cause them to follow a predetermined pattern in cutting and beveling operations has been an accomplished fact for some years. However, the automatically guided cutting torches still require the attendance of an operator because clean and accurate cutting is dependent upon proper spacing of the torch or torches with respect to the workpiece being cut or beveled. Plates which are supposed to be flat frequently are warped or bent with the result that, even though the torch or torches are properly spaced at the beginning of a cut, the spacing of a torch tip with respect to the plate varies as the torch travels across the plate. To maintain the quality of the cut an operator must continually re-adjust this spacing.

Of course, the same problem is encountered where automatically guided torches are used to cut curved plates. In such circumstances an operator must give his full attention to the cutting operation to maintain the correct tip to plate spacing as the curvature and the height of the plate above the cutting table changes along the course the torch follows.

Some years prior to the present invention it was recognized that the flame of a gas fueled cutting torch is electrically conductive and that the resistance of the flame is related to its length. With this knowledge at hand, it was theoretically possible to develop a torch positioning apparatus which could continuously maintain a predetermined spacing between the torch tip and the workpiece. Some attempts have been made to use the torch flame as the sensing element in the control circuit of a servo motor which is adapted to drive the torch closer or farther away from the work as the current flowing through or the voltage drop across the resistance of the flame exceeds or is less than some predetermined value indicative of a desired spacing between the torch tip and the workpiece.

It was anticipated that apparatus of this kind would be extremely valuable in view of the wider and wider use of gas cutting torches for cutting iron and steel shapes from flat and curved plates and for beveling the edges of previously cut plates in preparation for welding operations. It was found, however, that such apparatus is excessively unstable and erratic in its operation for reasons which could not be traced to the servo motor or any of its control circuitry. For this reason this concept of automatic tip to work spacing has not been successfully applied even though the idea was proposed many years ago.

I have conducted some investigations to determine the cause or causes of the erratic behavior of the known automatic torch spacing apparatus. The conclusions drawn from these investigations show that such erratic behavior is due primarily to the instability of the electrical resistance from the torch tip through the flame to the workpiece, even though the flame itself may be satisfactory for cutting purposes. I found that there were sharp and sudden changes in this resistance, as measured between the torch tip and the workpiece, which were frequently as large or larger than any changes due to significant changes in length of the flame itself. The result was that the positioning apparatus would respond to these seemingly spurious changes in flame resistance and would vary the tip spacing even though the tip was properly spaced.

Further experimentation disclosed to me that the total resistance was measured between the torch tip and the workpiece was in fact made up of two significant components. One of these is the electrical resistance of the flame itself. For a given torch tip and a particular fuel-to-oxygen ratio this resistance is substantially constant for each unit length of flame. The second component of the overall resistance is the contact resistance which exists between the tip of the torch and the flame. My observations have shown that for conventional torch tips this contact resistance is a substantial part of the overall resistance between the torch tip and the workpiece and, furthermore, that the contact resistance varies over a rather wide range relative to the total resistance as the fuel and oxygen supply pressures change even slightly. These pressure changes can cause changes in the total gas flow or changes in the fuel to oxygen ratio of gas flow or changes resulting from the combined effect of both of these changes. However, even with constant flow and constant fuel to oxygen ratio this contact resistance for conventional torch tips changes in a sporadic manner which makes it practically impossible to eliminate the resultant effects thereof in the control circuit by the use of electric filters which if effective for eliminating the results of these sporadic changes seriously affect the response of the control signal and renders it unsuited for control purposes.

I have invented a gas-fueled cutting torch tip which produces a flame that remains in good and substantially unvarying electrical contact with the tip even though the fuel gas and air or oxygen supply pressures vary over normal ranges. One highly desirable result is that the overall resistance between the torch tip and the workpiece is stabilized so that the flame becomes a suitable distance sensing element in automatic positioning apparatus. Another equally desirable result is that the overall resistance between the torch tip and the workpiece is lowered substantially because that component of the overall resistance at the contact between the torch tip and the flame is reduced. Moreover, once the contact resistance is stabilized at a low and constant value it constitutes a lesser proportion of the total resistance. Because the resistance per unit length of the flame itself is not affected, the overall resistance becomes a truer indication of the actual spacing between the torch tip and the workpiece.

According to my invention I stabilize the electrical characteristics of the flame produced by a gas-fueled torch by recessing the openings of the fuel gas passages into the tip or, in the alternative, by providing a skirt on the tip which extends beyond the openings of the fuel gas passages by an amount which is great enough to cause the root of the flame to stably recede within the recess formed by the skirt. In other words, I counterbore the preheat holes of a cutting torch tip to a depth and diameter great enough to cause the root of the flame to stably recede within the counterbore, and at the same time provide intimate contact between the torch body and the flame. Further, according to my invention, I may provide means for removing excess heat from the torch tip to prevent thermionic emission from the tip, which emission tends to alter the conductive properties of the flame even though the properties have been otherwise stabilized in accordance with the invention.

Where two or more torches are being operated together so that the flames produced by the torches are closely adjacent I further provide means for forming an air or non-combustible gas skirt to isolate from the adjacent flame the tip body of a torch flame which has been stabilized according to my invention.

A complete description of the several aspects and features of my invention is given in the following specification in which reference is made to the accompanying drawing. In the drawing:

Fig. 1 is a schematic representation of an automatic torch positioning apparatus incorporating my invention;

Fig. 2 is a view partly in section of a gas-fueled cutting torch tip according to my invention;

Fig. 3 is a view partly in section of a modified embodiment of the gas-fueled cutting torch tip according to my invention;

Fig. 4 is a section taken along line 4—4 of the torch tip shown in Fig. 3; and

Fig. 5 is a sectional view of a modification of the tip structure shown in Fig. 2.

So that my invention will be fully understood, I will first describe the components of an automatic torch positioning apparatus in which my invention may be incorporated. In Fig. 1 there is a movable work table 1 which, for the purposes of this description, will be assumed to move to the left as indicated by the arrow. A workpiece such as the bent plate 2 is positioned on the table 1 so that it is carried under the gas-fueled cutting torch 3. The invention is applicable to either oxy-acetylene torches or natural gas-fueled torches and appropriate distinctions will be made later on in the specification. Suffice it to say that the torch comprises a body 4, a tip 5 and a suitable mechanism for moving the torch up and down with respect to the workpiece. This mechanism may simply comprise a servo motor 6 which is suitably supported relative to table 1 and drives a gear 7. The gear engages a rack 8 fixed to the torch itself, as shown in Fig. 1, or to movable torch supporting apparatus. By these means the torch is driven up or down relative to table 1 and workpiece 2 depending on the direction in which the gear 7 is rotated by the motor.

Fuel gas and air or oxygen are supplied through flexible hoses 9 and 10 attached to the body of the torch.

As is known a flame is conductive and, if the flame is reasonably well defined, it has a characteristic resistance per unit length. As the space between the torch tip 5 and the workpiece 2 changes, the length of the flame bridging the space acts as a variable resistance. This variable resistance of the flame is used as the distance sensing element in a circuit controlling the torch positioning servo motor 6. Electrical connections to the flame must be made through the torch tip and the workpiece which are in contact with the flame. Accordingly, a connection 12 to the torch tip 5 and a connection 13 to the workpiece 2 which is grounded at 14 are connected in circuit with a battery 15, a switch 16 and a variable resistance 17. A potentiometer 18 is connected across battery 15 at points $a$ and $c$ and its slider 19 is connected thereto at point $b$. Points $b$ and $d$ of the bridge circuit thus formed are respectively connected by conductors 20 and 21 to the input of a servo-amplifier which has its output connected through conductors 23 and 24 to motor 6. By well-known means amplifier 22 provides a suitable voltage to motor 6 to control its direction and amount of rotation and thereby establish a predetermined separation of the torch tip and workpiece which will produce points of equipotential in the bridge circuit where its input conductors 20 and 21 are connected.

Slider 19 of potentiometer 18 is adjusted so that the voltage from points $a$ to $b$ is equal to the voltage from points $b$ to $c$ and the slider is then locked in this position to form a fixed voltage divider. It can then be seen that when the value of the resistance from torch tip to workpiece is the same as any adjusted value of resistance 17, there will be no voltage difference between points $b$ and $d$. If the resistance 17 is set to a value corresponding to the total flame resistance of a desired flame length, then at only that flame length will there be no voltage difference between points $b$ and $d$. If the total flame resistance is higher than desired due to the flame length being longer than desired, then point $d$ will be positive with respect to point $b$. Conversely, if the flame length is shorter than desired, then point $d$ will be negative with respect to point $b$. The value of these voltage differences will be in proportion to the amount that the flame length and resistance varies from the desired value set by the adjustment of resistance 17, and the polarity at this voltage will indicate if the flame length and resistance is greater or less than the desired value.

Servo-amplifier 22 is so adjusted that no output power is delivered to motor 6 when points $b$ and $d$ are at equal potential due to the total flame resistance being equal to the adjusted value of resistance 17. If the flame resistance is greater or less than the adjusted value of resistance 17, the output of amplifier 22 in response to its input will cause motor 6 to rotate in a direction to position the torch relative to the workpiece to make the flame resistance equal to the adjusted value of resistance 17. Should a longer or shorter distance from tip to workpiece be desired, resistance 17 will be adjusted to a higher or lower resistance value respectively.

In that part of the specification preceding the description of the drawing I describe in some detail the results of my investigation to determine the causes of instability in torch positioning apparatus of the kind described in connection with Fig. 1. As stated there, this instability was found to be due to an inconstant electrical contact between the flame and the tip of the cutting torch. It was also stated that substantial errors in the position of the torch were traced to the fact that the total resistance inserted in the circuit by connecting the control circuit to the torch tip comprises not only the actual resistance of the flame but also the contact resistance between the flame and the torch tip. Where conventional torch tips were used it was found that the contact resistance constituted a substantial part of the total resistance and introduced a significant variable error into the signal to which the servo motor control circuit responds.

Referring now to Fig. 2 I will describe my invention as it is embodied in a cutting torch tip of the type adapted to use natural gas or an equivalent gas as fuel. It is to be understood that in most respects the tip is a conventional "two piece" type adapted for use on a wholly conventional torch body including the necessary passages for delivering fuel and air or oxygen from hose connections to gas tanks. The tip is detachable from the torch itself. These features are so well known that they are not shown in Fig. 2 and they will not be described in greater detail here. This two-piece tip comprises a body or shell 40 having a relatively large diameter bore 41 in the upper part and a smaller coaxial bore 42 in the lower part. The second part of the tip is a separable insert having a substantially cylindrical part indicated at 43, the diameter of this part being somewhat less than the diameter of the bore 41 so that there is an annular space between the parts. This space is in communication with passages in the torch body through which a combustible mixture of fuel gas and oxygen or air is delivered from the hoses connected to supplies of those gases. Below the cylindrical part 43 the insert tapers gradually to a substantially cylindrical part 43a having a diameter which is less than the diameter of the bore 42 and this part of the insert is provided with a plurality of axially extending fins 44 which are proportioned so that the overall diameter of the lower part of the insert is the same as the diameter of the small bore 42. Thus, the fins serve to center the insert in the bore and hold it in position. As is well known, the spaces between the fins are in communication with the space between the cylindrical portion 43 and the interior surface of the large bore 41. A mixture of fuel gas and oxygen or air is delivered through these passages to the lower end of the tip. The passages between the fins are customarily referred to as the preheat holes and the flames produced by burning the mixture of gas and oxygen serve to preheat the metal of the workpiece to its kindling temperature. Oxygen delivered through a central passage 45 in the insert 43 emerges as a jet and burns away the metal heated by the preheat flame or flames.

Some natural gas tips of this kind are provided with a very shallow skirt or counterbore so that the openings of the preheat holes and the cutting oxygen passage are slightly recessed within the end face 46 of the tip. It was precisely this sort of tip which, I found, formed a flame in a manner that caused the unstable operation of automatic tip separation apparatus.

According to my invention, a tip of this kind may be simply and easily modified so that it forms a flame which is in good and stable electrical contact with the internal surface of the small bore 42 and so that the contact resistance between the flame and the tip is substantially less than that of conventional tips. Moreover, variations of fuel gas and oxygen or air supply pressures, and consequent variations in the fuel-to-oxygen ratio of the combustible gas mixture, which normally tend to change the shape and location of the root of the flame with respect to the end face of the tip, no longer result in substantial variations in the electrical contact between the flame and the tip.

The modification of this type of torch tip which I prescribe consists simply in recessing the ends of the gas passages farther into the end face 46 of the tip so that the root of the flame is formed well up into the bore 42 of the shell 40. Stated in another way, I provide a relatively long cylindrical skirt which extends axially from the end face 46 of the tip and which surrounds the cluster of preheat hole openings in the end face of the tip.

It is difficult to place precise limits on the depth to which the openings of the passages should be recessed within a skirt of sufficient diameter to surround the cluster of preheat holes in a particular tip. However, once the concept is grasped only a few simple trials will be necessary to establish the optimum depth for a particular tip. It will be found that for a given tip there is no advantage in going beyond a certain depth. On the other hand, it can be stated that a very definitely recognizable improvement in the stability of the contact resistance between the flame and the tip is obtained as the amount of the recess or, in other words, the length of the skirt is increased.

As a specific example, the assignee of this application manufactures a two-piece, natural gas type cutting torch tip identified as Style 229, No. 2 in which the standard skirt length or recess is slightly less than ⅛ inch and the diameter of the bore 42 is approximately 0.203 inch. This standard torch tip produces an excellent flame for cutting purposes, but the control signal which can be derived from the flame is quite unsatisfactory. Furthermore, the signal is very sensitive to changes in gas and oxygen supply pressures. However, when the skirt length or amount of recess is increased about 50 percent, that is, to approximately 11/64 inch, the signal derived from the flame by the means shown in Fig. 1 is stable and is relatively insensitive to changes of as much as 10 percent in the normal oxygen supply pressure.

Some sizes of tips of this two-piece type may require that the amount of recess be increased so much that the stream of cutting oxygen coming down from the central bore 45 will interfere with the formation of the flame. In that event the fins 44 extending out from the central part of the insert are cut back so that the preheat holes are effectively recessed to the necessary distance from the end face 46 of the torch tip, but the central part of the insert 43 surrounding the cutting oxygen passage is not recessed to the same degree.

Increasing the area of contact between the flame and the tip results in a considerable increase in the amount of heat absorbed by the torch tip. Some tips, particularly the smaller ones, become so hot that the tip itself begins to emit electrons in a manner analogous to the well-known phenomenon of thermionic emission. This has a pronounced and undesirable effect on the conductive characteristics of the flame. When it is necessary to overcome this effect I provide means for continuously cooling the tip to remove excess heat. The means I use in this specific embodiment is a jacket 47 surrounding the upper portion of the shell 40 and having therein an annular water passage or plenum 48. Synthetic rubber O rings 49 and 50 set in grooves in the jacket 47 above and below the plenum 48 serve as seals against leaking of water. Cooling water is supplied to the plenum through an inlet pipe 51 and the water which has absorbed heat from the shell 40 as it flows around through the plenum is drawn off through the pipe 52.

In Figs. 3 and 4 I have illustrated an oxy-acetylene type cutting torch tip modified according to my invention. This is a one-piece tip, comprising a body 53, which is bored to provide a plurality of preheat passages 54 clustered around a central cutting oxygen passage 55. In this type of tip all of the openings of the passages 54 are usually flush with the end face 56 of the tip. To apply my invention to a tip of this type I prefer to counterbore the openings of the preheat passages individually as shown at 57. As is the case with the natural gas type torch tip in Fig. 2, the relation between the diameter and depth of the counterbores which will cause the flame to root within the body of an oxy-acetylene type torch tip to the degree required for optimum stability of the signal derived from the flame is not subject to precise statement. In either instance it can be generally said that both the diameter and the depth of a flame skirt or counterbore determine the contact resistance between the torch tip and the flame. The smallest diameter into which the flame will stably recede produces the lowest contact resistance for a particular depth of counterbore. It can also be stated that, for a particular diameter of counterbore, the greatest depth to which the flame will stably recede also produces the lowest contact resistance. As a general rule I have found that satisfactory results are obtained if the diameter of each counterbore is within the range of more than one and less than two times the diameter of the preheat passage and if the depth of the counterbore is within the range of more than one and less than two times the diameter of the preheat passage. For most oxy-acetylene type tips optimum stability of the electrical characteristics of the flame are obtained if the diameters and depths of the counterbores are made 1.5 times the diameter of the preheat passages.

A specific example of my modification of an oxy-acetylene type cutting torch tip is as follows. The assignee of this application manufactures a standard oxy-acetylene cutting torch tip identified as Style 144, Size 2. The preheat holes of this tip have a diameter of 0.042 inch. I found that optimum flame stability and minimum contact resistance was obtained by counterboring each preheat hole to a depth of 0.062 inch and a diameter of 0.062 inch.

It will be found that some sizes of oxy-acetylene tips are also subject to overheating due to recession of the flame into the counterbore. The result will be the same as that described in connection with the natural gas tip illustrated in Fig. 2. A cooling jacket similar in all respects to that used in Fig. 2 proved to correct this difficulty. A more specific description for this particular embodiment is not believed to be necessary.

Automatic tip separation is, of course, applicable to multi-torch operation where, for example, two torches in tandem are used. The leading torch commonly serves to cut the plate and the closely adjacent trailing torch serves to cut a bevel on one of the newly cut edges of the plate. The preheat flame of one or the other of the torches is used to sense the separation of the tip from the workpiece exactly as in single torch apparatus and all torches are spaced from the work accordingly. Obviously, my invention is essential to stabilization of the resistance of the sensing flame. However, in practical tests of apparatus of this kind, I found that there was considerable interference with the electrical characteristics of the flame of the leading torch which was being used as the space sensing flame and that this interference could be traced to the flame of the trailing torch. Where the latter flame impinged on the workpiece it tended to wash onto the metal tip body of the sensing flame. Because the flames are constantly flaring off the workpiece in a highly irregular manner, the electrical effect of this interference by the trailing flame is the same as a rapidly and irregularly varying resistance in shunt with the effective total resistance from the sensing tip body to the workpiece.

I have found that even closely adjacent flames may be effectively isolated one from the other by providing a shroud or skirt of non-combustible, electrically non-conducting gas around the tip body of the sensing flame. The volume and velocity of gas required to produce an effective shield for this purpose has no perceptible effect on the cutting and beveling operation itself due to cooling of the work by the gas. I have used an air shroud but other equivalent gases may be used such as nitrogen, carbon dioxide and the like.

Multiple torch cutting apparatus is so well known that it is not believed necessary to describe nor show in the drawing the conventional components thereof. Therefore, I will only describe in detail the additional apparatus required to form an air shroud around the stabilized flame and its tip which has been modified in accordance with the prior description of Figs. 3 and 4.

In this embodiment the means for cooling the tip and the means for forming the air skirt are combined. A jacket 58 formed to surround a part of the length of the tip body 53 comprises an upper portion 59 and a lower portion 60. The internal construction of the upper portion is substantially the same in all respects as the construction of the cooling jacket 47 in Fig. 2 and includes an annular passage or plenum similar to 48 and sealing rings similar to 49 and 50. The cooling fluid, either air or water, enters through the pipe 61 and is drawn off through the pipe 62. The lower portion 60 of the jacket has a second annular passage or plenum 63 surrounding the body of the torch tip. Below the second plenum the jacket fits tightly against the external surface of the tip. A hose connection 64 through the wall of the jacket connects the lower plenum 63 to an air supply not shown.

In that portion of the jacket indicated at 65 which is immediately below the lower plenum 63 I drill or machine a number of small passages 66 which are circumferentially spaced around the torch tip as best illustrated in Fig. 4. These passages open at one end into the plenum 63 and at the other end into the lower end face 67 of the jacket and they direct jets of air from the plenum 63 downwardly along the surface of the tip body to enshroud it. Together these individual jets form the isolating air skirt for the tip body. The air supply pressure is adjusted to a value which produces sufficient velocity of the air in the skirt to blow the portion of the adjacent flame flaring off the workpiece away from the tip body. By this means modification of the total electrical resistance of the sensing flame due to influences of a closely adjacent flame are eliminated. The one flame is used as the sensing element in the control circuit for a motor which positions all of the torch cutting apparatus with respect to the workpiece.

As shown in Fig. 5 a conventional torch tip having the structural arrangement shown in Fig. 2 may be modified to embody my invention by adding a skirting ring 68 to the end face of a conventional tip in order to increase the depth of the recess therein so that the root of the flame is formed well up into the bore 42 of the shell 40. Preferably this skirting is made integral with the torch tip and electrically insulated therefrom so it may be directly connected into the control circuit by a wire 12 attached thereto instead of having this wire connected to the body portion of the tip and show in Figs. 2 and 3 where the body of the torch must be electrically insulated from its support.

The wire 12 shown in Figs. 2, 3 and 5 corresponds to the connection 12 shown in Fig. 1 by which the tip 5 is connected in circuit with the battery 15. My investigations have shown that the flame resistance is most stable and that there is least change in the conductive characteristics of the flame when the circuit is arranged so that the torch tip is negative with respect to the workpiece. If the torch tip is positive with respect to the workpiece, free electrons will be attracted from the surface of the heated workpiece to the positive torch tip, thus altering the conductive characteristics of the flame and changing its resistance. Thus for a given tip to workpiece separation, the flame resistance will decrease as the workpiece heats up. By maintaining the torch tip negative with respect to the workpiece and by keeping the torch tip so cool that it will not emit electrons, the flame conductive properties remain constant whether the workpiece is cold or heated, even to the extent of being molten.

In the foregoing description I have set forth the principles underlying my invention and have described specific embodiments thereof. The prescribed modifications of otherwise conventional cutting torch tips make automatic positioning of cutting torches with respect to a workpiece a practical technique where, prior to my investigations and subsequent invention, the apparatus, though its overall concept was known, could not be made to function properly under normally encountered operating conditions.

Although the invention has been described in terms of gas cutting apparatus it is not intended that its application should be so limited, for analogous modifications of welding torch tips can be made so that a gas welding torch may be automatically positioned at the proper distance from the workpiece. Furthermore, the invention may be employed for automatic contour following in applications other than gas cutting and welding by associating with such apparatus a nozzle embodying my invention to provide a stable pilot flame which would form a part of a control, operating as described above, to maintain the apparatus at a predetermined separation from a workpiece while the apparatus is moved relative thereto. Heat treating apparatus and arc-welding and arc-cutting apparatus could, for example, be made to follow the surface contour of a workpiece by using such a pilot flame control. Embodiments of the invention, other than those described and indicated above, will occur to those skilled in the art and it is my intention that all matter contained in the above description, or shown in the accompanying drawing, shall be interpreted as illustrative of my invention and not as a limitation thereof.

I claim:

1. In apparatus for maintaining a predetermined separation of a flame supporting torch device from a workpiece which apparatus includes means for passing electric current through its flame and between the torch tip and a workpiece and also includes means which are automatically responsive to variations in the electric conductivity of said flame for reducing the difference between the actual and a predetermined separation of the torch device from the workpiece, the improvement which comprises a torch tip body having a plurality of gas passages therethrough and positioned and arranged at one end to communicate with gas supply conduits in the torch, said passages having their openings at their opposite ends arranged in a cluster in one end face of the tip body, and a substantially cylindrical flame skirt extending axially from the tip body and surrounding the cluster of openings, the end portion of said skirt being formed by a metal ring which is electrically insulated from the tip body and the internal diameter and the length of said skirt being such that the root of the flame of the burning gases issuing from the passages stably recedes into the skirt for all practical gas supply pressures by an amount which produces a low and stable contact resistance between the flame and said skirt.

2. In apparatus for maintaining a predetermined separation of the tip of a flame supporting torch from a workpiece which apparatus includes means for passing electrical current through its flame and between said torch tip and said workpiece and also includes means which are automatically responsive to variations in the electrical conductivity of said flame for reducing the difference between the actual and a predetermined separation of said torch from said workpiece, the improvement which comprises a torch tip having in its end a recess, the diameter and depth of which are respectively about 1.5 times the diameter of the gas supply passageway in said torch for said flame, and within which the root of said flame stably recedes to maintain a low and substantially constant electrical contact with the internal surface thereof for the normally encountered pressure variations of the gas supplied through said passageway to said recess, whereby the total electrical resistance of said flame between said torch and said workpiece is more responsive to changes in its length with changes in the spacing of said torch tip from said workpiece.

3. In apparatus for maintaining a predetermined separation of the tip of a flame supporting torch from a workpiece which apparatus includes means for passing electrical current through its flame and between said torch tip and said workpiece and also includes means which are automatically responsive to variations in the electrical conductivity of said flame for reducing the difference between the actual and a predetermined separation of said torch from said workpiece, the improvement which comprises a torch tip having in its end a recess, the diameter and depth of which are respectively about 1.5 times the diameter of the gas supply passageway in said torch for said flame, and within which the root of said flame stably recedes to maintain a low and substantially constant electrical contact with the internal surface thereof for the normally encountered pressure variations of the gas supplied through said passageway to said recess, whereby the total electrical resistance of said flame between said torch and said workpiece is more responsive to changes in its length with changes in the spacing of said torch tip from said workpiece, and means for further maintaining changes in the total electrical resistance of said flame responsive primarily to changes in its length, said last mentioned means maintaining said torch tip electrically negative with respect to said workpiece for electrical current flow through said flame and also maintaining said tip at a temperature at which it will not become thermionic and emit electrons.

4. In the control of the separation of a flame supporting torch from a workpiece in response to the total electrical resistance of a flame between said torch and said workpiece, the improvement which comprises rendering the total electrical resistance of said flame more responsive to changes in its length and the spacing of said torch from said workpiece by counterboring the supply passageway in said torch for said flame to provide an enlarged recessed opening in its tip which will maintain the root of said flame to be formed well up into said opening to make a low and substantially constant electrical contact with said torch tip for the normally encountered pressure variations of the gas supplied through said passageway to said recess.

5. In the method of maintaining a predetermined separation of the tip of a flame supporting torch from a workpiece by passing electrical current through the flame between said torch tip and said workpiece and moving said torch toward and away from said workpiece in response to departures in the electrical conductivity of said flame from a predetermined value indicative of a desired separation of said torch tip from said workpiece, the improvement which comprises rendering the total electrical resistance of said flame between said torch tip and said workpiece more responsive to changes in its length by enlarging the tip opening of the gas passageway in said torch for said flame to provide in the tip of said torch a counterbore having a depth and diameter which will maintain the root of said flame to be formed well up into said counterbore to make an intimate electrical contact with said torch tip and produce a low and substantially constant electrical contact resistance between said flame and said torch tip.

6. The method of maintaining a predetermined separation of the tip of a flame supporting torch from a workpiece which comprises supplying electrical current to said torch tip and said workpiece and through said flame to secure indications of the changes in the total electrical resistance of said flame between said torch tip and said workpiece with changes in the length of said flame, enlarging the tip opening of the gas passageway in said torch for said flame to provide in the tip of said torch a counterbore having a depth and diameter which will maintain the root of said flame to be formed well up into said counterbore to make an intimate electrical contact with said torch tip and produce a low and substantially constant electrical contact resistance between said flame and said torch tip, prohibiting electron flow in said flame from said workpiece to said torch tip by having said torch tip at negative polarity relative to said workpiece for the electrical current flow through said flame and by cooling said torch tip to a temperature at which it will not emit electrons, and controlling the spacing of said torch tip from said workpiece in accordance with said indications of changes in the total electrical resistance of said flame between said torch tip and said workpiece to maintain the total electrical resistance of said flame substantially constant at a predetermined value corresponding to a desired predetermined separation of said torch tip from said workpiece.

References Cited in the file of this patent

UNITED STATES PATENTS

| | | |
|---|---|---|
| 1,995,120 | Fausek et al. | Apr. 17, 1934 |
| 2,210,402 | Gaines | Aug. 6, 1940 |
| 2,286,591 | Triest | Mar. 30, 1940 |
| 2,296,376 | Babcock et al. | Sept. 22, 1942 |
| 2,302,734 | Babcock | Nov. 24, 1942 |
| 2,364,645 | Mott et al. | Dec. 12, 1944 |
| 2,376,413 | Babcock | May 22, 1945 |
| 2,534,958 | Deming | Dec. 19, 1950 |